United States Patent [19]
Cannon et al.

[11] Patent Number: 5,423,086
[45] Date of Patent: Jun. 6, 1995

[54] DUAL PORT MEMORY COMMUNICATION FOR A RADIO FREQUENCY DEVICE AND A PERSONAL COMPUTER

[75] Inventors: Gregory L. Cannon, Delray Beach; William J. Macko, West Palm Beach; Gregory W. Fuller, Boca Raton, all of Fla.

[73] Assignee: Motorola, Inc., Schaumburg, Ill.

[21] Appl. No.: 963,148

[22] Filed: Oct. 19, 1992

[51] Int. Cl.⁶ .......................... H05K 11/00
[52] U.S. Cl. .................... 455/186.1; 455/89; 455/344
[58] Field of Search ............... 455/89, 90, 186.1, 348, 455/349, 38.3, 344; 340/825.44, 311.1

[56] References Cited

U.S. PATENT DOCUMENTS

| | | | |
|---|---|---|---|
| 5,030,948 | 7/1991 | Rush | 340/825.44 |
| 5,043,721 | 8/1991 | May | 340/825.44 |
| 5,239,306 | 8/1993 | Siwiak et al. | 340/311.1 |

OTHER PUBLICATIONS

PCMCIA, (Personal Computer Memory Card International Association), PC Card Standard, Release 2.0. Sep. 1991.

Primary Examiner—Reinhard J. Eisenzopf
Assistant Examiner—Thanh Le
Attorney, Agent, or Firm—Keith A. Chanroo

[57] ABSTRACT

A selective call receiver (130) receives radio transmitted messages and stores the received messages such that the messages may be simultaneously accessed from that memory by another device. The selective call receiver comprises an antenna (202) for receiving the transmitted messages, the antenna (202) being coupled to a receiver module (204) for recovering the messages. A decoder (206) is coupled for receiving the messages from the receiver module (204). A controller (212) is coupled for determining whether the recovered message is addressed to the selective call receiver (130). A dual port RAM (208) is coupled to the controller (212) via a first address and data bus for storing the messages addressed to the selective call receiver (130), and the dual port RAM (208) has a second address and data bus for providing simultaneous access to another device.

6 Claims, 2 Drawing Sheets

DUAL PORT MEMORY COMMUNICATION FOR A RADIO FREQUENCY DEVICE AND A PERSONAL COMPUTER

FIELD OF THE INVENTION

This invention relates in general to the field of message communication systems, and more particularly, to an apparatus and method for improved communication between a Radio Frequency (RF) device and a Personal Computer (PC).

BACKGROUND OF THE INVENTION

Communication systems, such as paging systems, typically communicate messages from an originating device to one or more destination devices. These messages can include numeric and alphanumeric information for a user of the destination device. The destination device, for example, a selective call receiver or pager, typically presents the information received to the user by displaying the information on the pager's display.

Contemporary paging systems, necessarily using pagers having small form factors, offer limited message displays for communicating information. For example, an alphanumeric message is typically limited to 80 characters or less in length. These typical message lengths have provided users reasonably reliable delivery of messages while meeting a market need to communicate limited information in a wireless environment and with little delay.

Users, on the other hand, desire to receive information comprising much longer character lengths, such as from ten to one hundred times longer character lengths or more than historically available with selective call receivers. Examples of such desired information includes, for example, E-mail (Electronic mail) which can communicate overnight news and weather, sports coverage, stock quotes, etc.

The need for receiving longer length messages in a wireless environment has been met by integrating a selective call receiver or pager with a notebook, laptop or palmtop personal computer. The pager receives the message and is able to store that message in an internal memory. The personal computer next reads the contents of the pager's memory into the memory of the personal computer for output on the personal computers larger display. One of the major benefits of such wireless communication is the timeliness of receiving, and hence displaying the message. The longer messages, however, due to sheer size alone, necessarily increase the time for display as the message is transferred from pager memory to personal computer memory. If a pager has a memory and must transfer a message stored therein using a bus protocol, and the personal computer must re-transfer the stored message back to its own memory, then resources and time are wasted. This is because personal computers work best with memory type accesses, instead of communication protocols across a shared bus.

Thus, what is needed is a Radio Frequency (RF) device and a Personal Computer (PC) having a dual port memory as a communication means for memory type accesses therebetween.

SUMMARY OF THE INVENTION

In accordance with the present invention, a selective call receiver for receiving radio transmitted messages and for storing the received messages such that the messages may be simultaneously accessed by another device is provided. The selective call receiver has an antenna, for receiving a the transmitted messages, coupled to a receiver module for recovering the transmitted message. A decoder is coupled to the receiver module for address decoding such that a controller coupled thereto can determine whether the recovered signal is addressed to the selective call receiver. The selective call receiver uses a dual port RAM, coupled to the controller via a first address and data bus for storing recovered signals addressed to the selective call receiver, and having a second address and data bus for providing simultaneous access to the another device. Hence the another device, typically a personal or laptop computer can access the memory of the selective call receiver as if it were the memory of the another device. The speed and efficiency of communication between the selective call receiver and the another device is thereby improved.

DESCRIPTION OF THE PREFERRED EMBODIMENT

Figure 1:
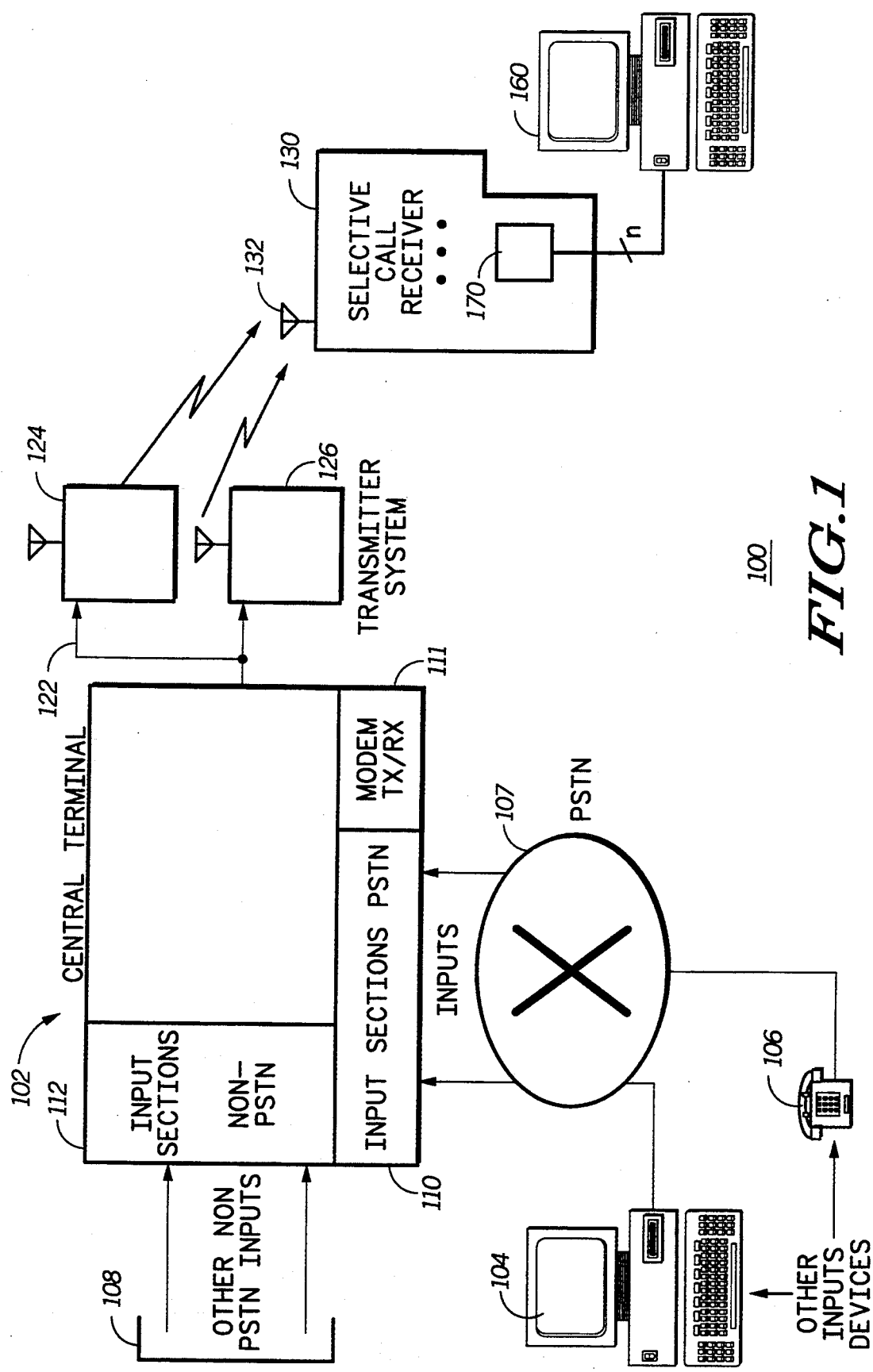
FIG. 1 is a block diagram of a communication system having a paging transmitter and a portable remote unit.

FIG. 1 shows a communication system 100 using a paging transmitter system 122, 124, and 126 for delivering messages to at least one portable remote unit, for example a portable selective call receiver 130 having a data transfer block 170 for communicating with a laptop or palmtop computer 160. A central terminal 102 comprises input sections 110, and 112 for receiving inputs from a number of different devices 104, 106, and 108, including receiving page requests for initiating pages that are transmitted by the paging transmitting system 122, 124, and 126 to the at least one remote portable unit 130, 160. The central terminal 102 has input sections 110 that interface with the telephone company equipment, such as a public switched telephone network (PSTN) 107. Personal computers or other computing devices 104 can access the input sections 110 through the PSTN 107 using a dial-up telephone line and modem connection. Other calling devices, such as telephone input devices 106 can access the input sections 110 of the central terminal 102 through the PSTN 107. Typically, these input devices 104, 106, can remotely initiate page requests through the central terminal 102 by calling up the input sections 110 of the central terminal 102 over dial-up telephone lines of the PSTN 107.

Alternatively, other input sections 112 of the central terminal 102 can receive inputs, such as page requests, from local computing devices 108, such as a local personal computer or console or other terminal device. Typically, the one or more local input devices 108 interface with the input sections 112 of the central terminal 102 via direct wire line connections using standard RS-232 or RS-422 interface. Additionally, today, in part due to additional memory in the selective call receiver 130, the interface to portable personal computers, and the increased reliability of communication, page requests are much more sophisticated than the past common page requests to call a displayed phone number, or a short alpha-numeric message. Up to date news, weather, stocks prices, technical information, sales information, and ever increasing new types of messages are being transmitted.

Figure 2:
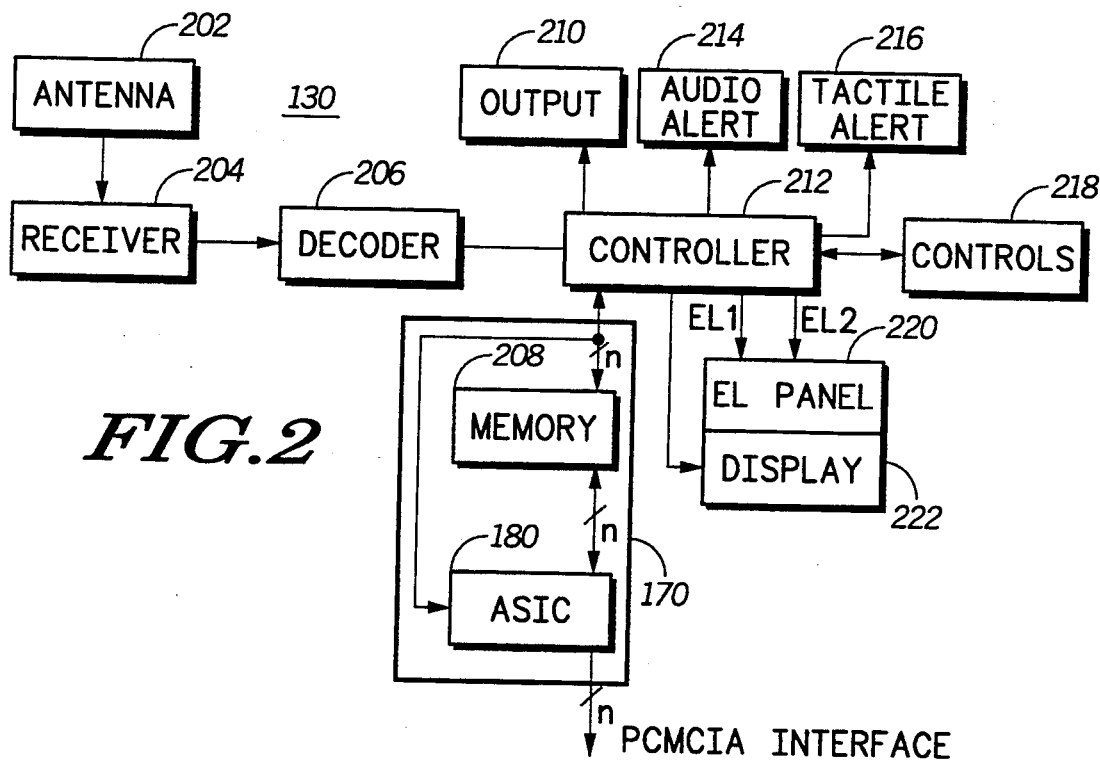
FIG. 2 is a block diagram of a selective call receiver according to the present invention.

FIG. 2 illustrates the selective call receiver 130 (i.e., a pager) in greater detail comprising an antenna 202 for providing an RF carrier signal that is mixed with a local oscillator signal contained within a receiver module 204. The receiver module 204 generates a recovered signal suitable for processing by a decoder 206 in a manner well known to those skilled in the art. The decoder 206 then converts the recovered signal into an address. A controller 212 compares the decoded address with one or more predetermined addresses stored in a memory 208. If the decoded address and one of the predetermined addresses are substantially similar, the user is alerted that a signal has been received either by an audio alert 214 (for example, a speaker) or by a tactile alert 216 (for example, a vibrator). The received signal may also include optional message data directed to some selective call receivers. Also, if the selective call receiver includes an optional voice output, recovered audio portions of the received R. F. signal may be presented on an output module 210. The operation of a selective call receiver of the general type is well known and is more fully described in U.S. Pat. No. 4,518,961 issued May 21, 1985 and assigned to the same assignee as the present invention and is hereby incorporated by reference.

For the message display selective call receiver 130, the recovered message is stored in the memory 208 for subsequent presentation on a display. The display could be an integral part of the selective call receiver 130, such as an EL panel 220, in which case the message display is typically limited to 80 characters. The EL panel 220 is coupled to the controller 212 via lines EL1 and EL2. A display 222, shown as an integral part of the EL panel 220, will automatically, or when manually selected by controls 218, illuminate the message. Alternatively, the display need not be an integral portion of the selective call receiver 130 if the selective call receiver 130 is coupled to a personal computer, for example, a laptop computer 160, in which case a substantially larger message area is available for displaying the message.

In the preferred embodiment of the present invention, the memory 208 stores the received message(s) until accessed by the laptop computer 160 for display. The remote portable unit 130, 160, is powered, typically, by a rechargeable battery. Hence, there is a need to use processing time efficiently. Since the messages received may be of substantial length, the time to transfer such messages from the selective call receiver 130 to the laptop computer 160 is important. Furthermore, an important advantage of paging technology is the ability to receive and interpret transmitted messages quickly.

Peripheral devices connected to personal computers, often have their own internal memory for temporarily storing information necessary to perform required functions and to communicate with that personal computer. Furthermore, such peripheral devices are often connected to a bus over which information in the memory must be transferred via a bus protocol before being stored in the personal computer's memory. At least two drawbacks result: first using a bus protocol requires time and computing resources; and second, redundant memory space is required immediately prior, during and immediately after the transfer.

In the preferred embodiment of the present invention, both computing resources and memory efficiency are improved by using a dual port RAM (Random Access Memory) for storing information in the selective call receiver 130. Referring again to FIG. 2, the memory 208, an integral part of the selective call receiver 130, is a dual-port RAM coupled between the controller 212 of the selective call and an ASIC (Application Specific Integrated Circuit) 180. The dual-port RAM 208 allows simultaneous data access by two devices via dual address and data busses as is well known to those skilled in the art. A first address/data bus having n bits, for example 16 address bits and eight data bits, connects the dual-port RAM 208 to the controller 212 for selective call receiver 130 memory access. A second address/data bus, also having n bits, for example, 16 address bits and eight data bits, connects the dual-port RAM to the ASIC 180.

The controller 212 is also connected to control the ASIC 180 for properly interfacing the selective call receiver 130 to the laptop computer 160 via a PCMCIA interface (Personal Computer Memory Card International Association). PCMCIA interfaces are well known to those skilled in the art, and is described by PCMCIA, PC Card Standard, Release 2.0, September 1991, which is hereby incorporated by reference. More specifically, the ASIC 180 contains logic circuitry and registers to control the PCMCIA interface to properly pass commands and data between the selective call receiver 130 and the laptop computer 160. As an example, the ASIC 180 controls the signals to the dual-port RAM 208 for reading and writing from each of the two address/data ports. Additionally, in the preferred embodiment, the ASIC 180 converts a 5 volt supply to a 3 volt supply.

By incorporating the dual-port RAM 208 connected to the laptop computer 160 via the PCMCIA interface, the laptop computer 160 essentially has constant access to the dual-port RAM 208 as though the dual-port RAM 208 were additional laptop computer 160 memory. Similarly, the selective call receiver 130 will be more easily able to access information, stored in the dual-port RAM 208 by the laptop computer 160. This is accomplished, for example, by establishing a set of memory locations for letting the laptop computer 160 and the selective call receiver 130 determine whether a message (data) exists for the laptop computer 160 or the selective call receiver 130 to examine. Additionally, that message could signify what is to be done with data stored therein, for example, use as data or as a command. As a result, the selective call receiver 130 communicates more quickly and efficiently with the laptop computer 160.

Figure 3:
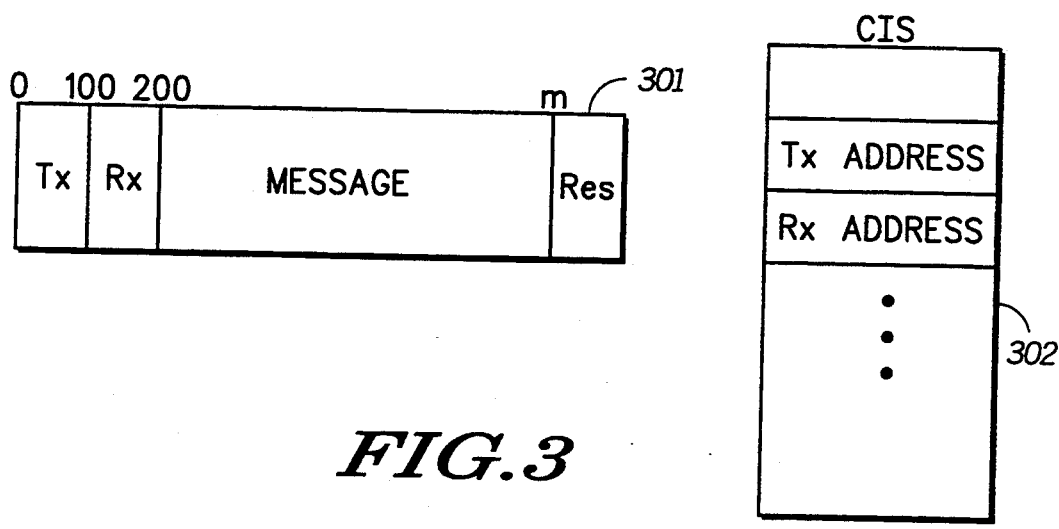
FIG. 3 is a memory map of the information structure stored within a dual port RAM.

Referring now to FIG. 3, a PCMCIA protocol for the PCMCIA interface between the selective call receiver 130 and the laptop computer 160 is shown. Current PCMCIA protocols for modem products provide transmit and receive ports at predetermined addresses which requires address decoding to those predetermined addresses to work with pre-existing software. Communication over the PCMCIA interface can be made more flexible by making the PCMCIA interface configurable. Configurability is accomplished by using a procedure to setup a plurality of receive and transmit ports, as well as a basic protocol addend port for additional data integrity needs.

More specifically, particular parameters are written into an index register for each communication parameter for configuration. A card information structure (CIS) 302 comprises a plurality of index registers for storing parameters for each communication parameter that the system will configure. Example configurable parameters include: transmit buffer length; receive buffer length; transmit protocol check characters (no check, checksum, cyclic redundancy code (crc)); receive protocol check characters (no check, checksum, crc); message protocol types (MORE_BIT, Length prefix, etc.); start address of transmit buffer; start address of receive buffer; and data transfer status support (data register empty/full, transfer complete, etc.). An address map 301 is given as an example of start addresses for the transmit and receive buffers, and the message address area.

In like manner, a memory card may be configured for obtaining data in a parallel fashion with a linear data/address space, or as a link list implementation with a particular node size.

The laptop computer 160 could configure the selective call receiver 130 to have two receive ports starting at a particular address, and have 128 transmit ports at another address, each of the 128 transmit ports having a two byte crc protocol addend port. A variety of signaling schemes would be available to allow for the transfer of data and PCMCIA bus arbitration. The protocol for querying messages and configuration status from the selective call receiver 130 could be specified.

The selective call receiver 130, therefore, can be taught a particular protocol described by a manufacturer of the laptop computer 160. In the case where a protocol is not specified for a given personal computer, a default or suggested protocol would be assumed by the selective call receiver 130.

An alternative to having the laptop computer 160 configure the selective call receiver 130 is for the selective call receiver 130 to configure itself to adapt to the laptop computer 160. In this case the selective call receiver 130 would assume a default or suggested protocol. If this is not the protocol employed by the laptop computer 160, then the selective call receiver could query the laptop computer for the protocol. For example, the selective call receiver could read the protocol definitions from the laptop computer and compare to the default protocol. If a match is not made, then the laptop protocol parameters could be stored by the selective call receiver 130 to define the laptop computer 160 protocol parameters.

Although the present invention has been described in relation to particular embodiments thereof, many other variations and modifications and other uses will become apparent to those skilled in the art. For example, the portable remote unit need not comprise a laptop computer but could comprise a palmtop or other portable computer. The computer need not be limited to a portable computer to benefit from the invention, though the power savings would be less of a concern. The selective call receiver need not have a display as described, but could depend entirely upon the display of the computer coupled thereto. Additionally, the configurable protocol need not be limited to PCMCIA interfaces. The ability for the selective call receiver to adapt to the computer could be extended to other types of peripheral devices that could benefit from adapting to the type of computer the peripheral connects to. Therefore, the present invention is limited only by the claims.

We claim:

1. A selective call receiver for receiving radio transmitted messages and for storing the received messages such that the messages can be simultaneously accessed, said selective call receiver comprising:
    an antenna for receiving the transmitted messages;
    a receiver module coupled to the antenna;
    a decoder coupled for receiving a recovered signal from the receiver module;
    a controller coupled for determining whether the recovered signal is addressed to said selective call receiver;
    a dual port RAM, coupled to said controller, wherein the controller accesses the dual port RAM via a first address and a data bus for storing recovered signals addressed to said selective call receiver;
    a reconfigurable PCMCIA interface couples the dual port RAM to another device via a second address and the data bus for providing the simultaneous access to the dual port RAM by the controller and the another device, the another device reconfigures the reconfigurable PCMCIA interface to communicate in a plurality of signaling schemes by providing communication parameters which assign receive and transmit ports of the reconfigurable PCMCIA interface and reconfigures the selective call receiver via the reconfigurable PCMC interface by providing the communication parameters which includes a protocol definition from the another device coupled thereto for configuring the selective call receiver for communicating with said another device:
    an ASIC circuit having a plurality of registers therein for storing PCMCIA port addresses such that memory locations of said dual port RAM are defined by the plurality of registers for configuring the reconfigurable PCMCIA interface to a PCMCIA protocol defined by the protocol definition: and
    a plurality of index register for storing the protocol definition for reconfiguring the selective call receiver.

2. A remote unit for receiving and displaying radio transmitted messages, comprising:
    a selective call receiver comprising:
        an antenna for receiving the transmitted messages;
        a receiver module coupled to the antenna;
        a decoder coupled for receiving a recovered signal from the receiver module;
        a controller coupled for determining whether the recovered signal is addressed to said selective call receiver; and
        a dual port RAM coupled to said controller for providing access to the controller, wherein the dual port RAM is accessed by the controller via a first address and a data bus for storing the recovered signals addressed to said selective call receiver; and
        a reconfigurable PCMCIA interface, coupled to the dual port RAM, accesses the dual port RAM via a second address and the data bus;
    a computer coupled to said selective call receiver via the reconfigurable PCMCIA interface for retrieving the recovered signal from said dual port RAM for display on said computer, wherein the computer accesses the dual port RAM simultaneously with said controller for retrieving the recovered signal therefrom, the computer reconfigures the reconfigurable PCMCIA interface to communicate in a plurality of signaling schemes by providing communication parameters for assigning receive and transmit ports of the reconfigurable PCMCIA interface according to a protocol definition of the computer; and an ASIC circuit having a plurality of registers therein stores PCMCIA port addresses such that memory locations of said dual port RAM are defined by the plurality of registers for configuring the reconfigurable PCMCIA interface to a PCMCIA protocol defined by the protocol definition.

3. The remote unit according to claim 2 wherein a first portion of said dual port RAM is reserved for said computer for storing instructions for said selective call receiver, and a second portion of said dual port RAM is reserved for storing instructions for said computer.

4. The remote unit according to claim 3 wherein said computer is a laptop computer.

5. The remote unit according to claim 3 wherein said selective call receiver is a pager.

6. The remote unit according to claim 5 wherein a third portion of said dual port RAM is reserved to store PCMCIA interface configuration parameters; wherein the remote unit further comprises:

means for receiving the protocol definition from the computer coupled thereto for reconfiguring the pager for communicating with said computer.

* * * * *

UNITED STATES PATENT AND TRADEMARK OFFICE
CERTIFICATE OF CORRECTION

PATENT NO. : 5,423,086
DATED     : June 6, 1995
INVENTOR(S) : Gregory L. Cannon

It is certified that error appears in the above-indentified patent and that said Letters Patent is hereby corrected as shown below:

Column 6, line 26, change "PCMC" to --PCMCIA--.

Signed and Sealed this

Twenty-first Day of November, 1995

Attest:

BRUCE LEHMAN

Attesting Officer          Commissioner of Patents and Trademarks